US010569955B2

(12) United States Patent
Frangeul

(10) Patent No.: US 10,569,955 B2
(45) Date of Patent: Feb. 25, 2020

(54) INTRALOGISTIC ARRANGEMENT

(71) Applicant: INTERROLL HOLDING AG, Sant' Antonino (CH)

(72) Inventor: Xavier Frangeul, Sant' Antonino (CH)

(73) Assignee: INTERROLL HOLDING AG, Sant' Antonino (CH)

( * ) Notice: Subject to any disclaimer, the term of this patent is extended or adjusted under 35 U.S.C. 154(b) by 0 days.

(21) Appl. No.: 15/914,383

(22) Filed: Mar. 7, 2018

(65) Prior Publication Data

US 2018/0257861 A1 Sep. 13, 2018

(30) Foreign Application Priority Data

Mar. 9, 2017 (EP) ..................... 17160023

(51) Int. Cl.
*B65G 1/04* (2006.01)
*G06Q 50/04* (2012.01)
*G06Q 10/08* (2012.01)
*G05D 1/02* (2020.01)

(52) U.S. Cl.
CPC ......... *B65G 1/0492* (2013.01); *G05D 1/0297* (2013.01); *G06Q 10/08* (2013.01); *G06Q 50/04* (2013.01); *G05D 2201/0216* (2013.01); *Y02P 90/30* (2015.11)

(58) Field of Classification Search
CPC .................. G05Q 10/08; G06Q 10/08; G05D 2201/0216; B65G 1/0492
See application file for complete search history.

(56) References Cited

U.S. PATENT DOCUMENTS

| 5,180,344 | A | 1/1993 | Hall |
| 5,442,248 | A | 8/1995 | Agnoff |
| 5,485,590 | A | 1/1996 | Hyatt et al. |
| 5,530,643 | A | 6/1996 | Hodorowski |
| 6,117,318 | A | 9/2000 | Simonelli |
| 6,124,656 | A | 9/2000 | Jensen |
| 6,200,036 | B1 | 3/2001 | Girardey |
| 6,240,335 | B1 | 5/2001 | Wehrung et al. |

(Continued)

FOREIGN PATENT DOCUMENTS

| AT | 508662 | 3/2011 |
| AT | 13066 | 5/2013 |

(Continued)

*Primary Examiner* — Kaitlin S Joerger
(74) *Attorney, Agent, or Firm* — Price Heneveld LLP

(57) ABSTRACT

The invention relates to an arrangement for intralogistical handling of items, comprising a storage station for storing a plurality of drive units, each drive unit comprising a drive coupling interface. A first handling station is positioned in distance to the storage station, said first handling station comprising a driven coupling interface for coupling to said drive coupling interface of a drive unit out of the plurality of drive units. A control unit is Coupled for signal transmission with the first handling station and to receive a request signal from the first handling station. The request signal comprises data indicating that a drive unit is required by the first handling station, and further outputs a transport signal upon receipt of a request signal, said transport signal comprising data indicating that a drive unit out of the plurality of drive units is to be transported to the first handling station.

45 Claims, 2 Drawing Sheets

(56) References Cited

U.S. PATENT DOCUMENTS

| | | |
|---|---|---|
| 6,633,278 B1 | 10/2003 | Hoegener et al. |
| 6,672,449 B2 | 1/2004 | Nakamura et al. |
| 6,701,214 B1 | 3/2004 | Wielebski et al. |
| 7,207,433 B2 | 4/2007 | Schaefer |
| 8,006,829 B2 | 8/2011 | Itoh et al. |
| 8,359,127 B2* | 1/2013 | Wang .................. G05D 1/0282 701/2 |
| 8,381,901 B2 | 2/2013 | Yamamoto |
| 8,757,363 B2 | 6/2014 | Combs et al. |
| 9,359,142 B2 | 6/2016 | Jepsen |
| 9,618,056 B2 | 4/2017 | Itoh |
| 9,637,318 B2* | 5/2017 | Messina ............... B65G 41/008 |
| 9,731,900 B2 | 8/2017 | Ruggeri |
| 9,901,210 B2* | 2/2018 | Chan .................. A47J 37/0713 |
| 10,289,105 B1* | 5/2019 | Oh .......................... H04W 4/00 |
| 2002/0010527 A1 | 1/2002 | Wielebski et al. |
| 2003/0168316 A1 | 9/2003 | Knepple et al. |
| 2004/0122570 A1* | 6/2004 | Sonoyama ........... G05D 1/0297 701/23 |
| 2004/0144623 A1 | 7/2004 | Newsom et al. |
| 2005/0083188 A1 | 4/2005 | Choi |
| 2005/0246078 A1* | 11/2005 | Vercammen ......... G05D 1/0236 701/23 |
| 2006/0293782 A1 | 12/2006 | Rees |
| 2007/0197072 A1 | 8/2007 | Hvidberg et al. |
| 2008/0270427 A1 | 10/2008 | Franke et al. |
| 2010/0322473 A1 | 12/2010 | Taylor et al. |
| 2011/0106362 A1* | 5/2011 | Seitz .................... G05B 19/416 701/24 |
| 2012/0024669 A1 | 2/2012 | Danelski et al. |
| 2012/0175223 A1 | 7/2012 | Breen et al. |
| 2012/0175225 A1 | 7/2012 | Breen et al. |
| 2012/0211330 A1 | 8/2012 | Ziegler |
| 2012/0259436 A1 | 10/2012 | Resurreccion et al. |
| 2012/0290126 A1 | 11/2012 | Combs et al. |
| 2013/0134017 A1 | 5/2013 | Hall et al. |
| 2013/0190915 A1* | 7/2013 | Choo ................. G05B 19/4189 700/113 |
| 2014/0156063 A1 | 6/2014 | Neiser et al. |
| 2014/0277698 A1 | 9/2014 | Combs et al. |
| 2014/0326582 A1 | 11/2014 | Sakaguchi |
| 2015/0068874 A1 | 3/2015 | Jepsen et al. |
| 2015/0151921 A1 | 6/2015 | Collot |
| 2016/0080526 A1 | 3/2016 | Meyer-Graefe |
| 2016/0236869 A1* | 8/2016 | Kimura ............... G05D 1/0291 |
| 2016/0318714 A1 | 11/2016 | Reischl |
| 2017/0101263 A1* | 4/2017 | Schroer ............... B65G 1/0407 |
| 2018/0009607 A1 | 1/2018 | Tiedemann |
| 2018/0096299 A1* | 4/2018 | Jarvis ................ G06Q 10/0875 |
| 2018/0127212 A1* | 5/2018 | Jarvis ................ B65G 1/0435 |
| 2018/0211347 A1* | 7/2018 | Chen .................... G05D 1/0297 |
| 2018/0222047 A1* | 8/2018 | Nishi .................... G05D 1/0274 |
| 2018/0305122 A1* | 10/2018 | Moulin .................... B65G 1/02 |
| 2019/0062135 A1* | 2/2019 | Goetz .................... B66F 9/072 |

FOREIGN PATENT DOCUMENTS

| | | |
|---|---|---|
| CN | 2033808 U | 3/1983 |
| CN | 2199164 Y | 5/1995 |
| CN | 203682423 U | 7/2014 |
| DE | 1978258 | 2/1968 |
| DE | 3538173 | 1/1987 |
| DE | 4230729 | 3/1993 |
| DE | 69306884 | 5/1997 |
| DE | 19811130 | 9/1999 |
| DE | 102006004421 | 8/2006 |
| DE | 102006054575 | 9/2008 |
| DE | 102008053557 | 9/2009 |
| DE | 102008018205 | 12/2009 |
| DE | 202008017534 | 12/2009 |
| DE | 20200902821 | 2/2011 |
| DE | 202009012822 | 2/2011 |
| DE | 202012000793 | 4/2012 |
| DE | 102010044027 | 5/2012 |
| DE | 102011004802 | 8/2012 |
| DE | 102011109531 A1 | 2/2013 |
| DE | 102015106026 | 8/2016 |
| DE | 102015104130 | 9/2016 |
| DE | 102015106034 | 10/2016 |
| DE | 102015106024 | 11/2016 |
| DE | 102015107167 | 11/2016 |
| DE | 102015114030 | 3/2017 |
| EP | 1021664 | 1/2002 |
| EP | 1454851 | 9/2004 |
| EP | 1656312 | 5/2006 |
| EP | 1675244 | 6/2006 |
| EP | 2369211 | 9/2011 |
| EP | 2455310 | 5/2012 |
| EP | 3212543 A1 | 9/2017 |
| JP | S5741821 | 3/1982 |
| JP | S5890447 | 5/1983 |
| JP | S59180609 | 10/1984 |
| JP | S6015308 | 1/1985 |
| JP | H05236612 | 9/1993 |
| JP | 2003026603 | 1/2003 |
| JP | 2003104534 | 4/2003 |
| JP | 2004098554 | 4/2004 |
| JP | 2014516895 | 7/2014 |
| JP | 2014142740 | 8/2014 |
| KR | 101404023 | 6/2014 |
| WO | 0203153 | 1/2002 |
| WO | 02098768 | 5/2002 |
| WO | 2010142029 | 12/2010 |
| WO | 2011029120 | 3/2011 |
| WO | 2012094690 | 7/2012 |
| WO | 2012113922 | 8/2012 |
| WO | 2012154650 | 11/2012 |
| WO | 2013000006 | 1/2013 |
| WO | 2013000006 A2 | 1/2013 |
| WO | 2014011459 | 1/2014 |
| WO | 2014057984 | 4/2014 |
| WO | 2016066495 A1 | 5/2016 |
| WO | 2016169982 | 10/2016 |
| WO | 2016169986 | 10/2016 |
| WO | 2016177906 | 10/2016 |
| WO | 2014178399 | 2/2017 |
| WO | 2018009607 A1 | 1/2018 |

* cited by examiner

INTRALOGISTIC ARRANGEMENT

CROSS-REFERENCE TO FOREIGN PRIORITY APPLICATION

The present application claims the benefit under 35 U.S.C. §§ 119(b), 119(e), 120, or 365(c) of EP17160023.2 filed Mar. 9, 2017.

FIELD OF THE INVENTION

The invention relates to an arrangement for intralogistical handling of goods, comprising a storage station and a first handling station positioned in distance to the storage station. A further aspect of the invention is a method of handling items in an intralogistical handling process and a drive unit for handling of items in a handling unit.

BACKGROUND OF THE INVENTION

Intralogistical handling of items comprises a number of different tasks and processes and is generally understood to relate to processes which take place in a facility like a production facility, a storage facility, a warehouse, a distribution facility, a transportation facility or any other facility, wherein items are to be manufactured, stored, buffered, distributed, sorted, or the like. Inside such a facility an arrangement for the intralogistical handling of the items is installed. Such an arrangement usually comprises at least one storage station which might serve to take up a number of items for temporary storage and to give away a single or a plurality of items if required to conduct the handling process inside the arrangement. Further, a handling station is included in such an arrangement for intralogistical handling and usually interacts with a plurality of further additional handling stations. A handling station is understood to be adapted to conduct a single or a plurality of handling steps of one or a plurality of items. Such handling steps may be conveying the item, sorting items according to predetermined criteria, buffering items for temporary storage, lifting items from one level to another level, sorting items, a packaging process of items, a manufacturing process or assembling process of items, and any steps of analyzing characteristics of items or the like. In particular, such a handling station may be adapted to conduct a plurality of such handling steps, e.g. a handling station may sort items by a lifting and a longitudinal and selectively transverse conveying step and buffer the items in a sorted arrangement to give out selected items out of said sorted buffer arrangement at a later stage.

It is generally understood that such arrangements are built up inside a building or may be positioned outside and it is known to plan the dimension and capacity of such arrangements according to the actual needs. Such planning and designing of an arrangement for intralogistical handling will ensure that the arrangement is always capable of fulfilling its function, be it buffering of items, conveying of items, productions steps, assembling steps or packaging of items or the like.

In use of such arrangements it is of utmost importance that the handling process inside the arrangement is not interrupted by failure of individual parts of the arrangement. It is generally known to address this need by facilitating the replacement of failed parts, e.g., by introducing plug-and-play solutions as far as possible. Intralogistical conveyor arrangements like the one described in WO 2016/169986 A2 are an example for such improved solutions to reduce the out-of-service time of conveyor arrangements.

In such plug-and-play solutions, however, it is a challenging task to ensure that a component to be replaced is replaced in such a way that a full functionality is established hereafter. In particular, in view of such arrangements for intralogistical handling fulfilling a number of different handling steps it is required to provide the right plug-and-play part for the part to be replaced and to care for correct configuration of soft- and hardware when installing the new part. WO 2016/169982 A1 and WO 2016/177906 A1 disclose control units which are capable of interacting with different parts of different configurations and are configured to conduct internal installation and adaption to different hardware components connected to the control unit to address this problem. However, this requires the use of control units with enhanced intelligence programmed on board of the control unit.

Beside the problem of out-of-service time intervals due to failed parts inside such intralogistical handling arrangements, a further problem is related to the need for modification processes at such arrangements. Depending on the need for different handling steps or sequences or the need for reduced or increased capacity for handling of items, it will be required from time to time to change the configuration of a handling station itself or of the arrangement of the handling stations inside such an arrangement or to add and connect a further handling station to such an arrangement. In the course of such modification, it will often be required to interrupt the handling of items inside the arrangement to be able to conduct the required assembling steps inside the handling station or for installing additional handling stations or the like. It is known to minimize such out-of-service times by improving the connectivity and reducing the installation steps required for installing additional handling stations or reconfiguring parts or sections in such a handling station. Examples for such improvements are disclosed in the patent applications mentioned beforehand. While this may significantly improve the efficiency of an intralogistical handling arrangement in general, there is a need for further improving this specific aspect, in particular in such applications of intralogistical handling where the required handling capacity may change often and is hardly predictable.

The invention is based on such prior art and is directed to the problem of improving the capability of an intralogistical handling arrangement to provide the handling process with less out-of-service times and in the capacity as required by the actual needs.

This object is achieved by an arrangement for intralogistical handling of items, comprising a storage station for storing a plurality of drive units, each drive unit comprising a drive coupling interface, a first handling station positioned in distance to the storage station, said first handling station comprising a driven coupling interface for coupling to said drive coupling interface of a drive unit out of the plurality of drive units, a control unit which is coupled for signal transmission with the first handling station and is configured to receive a request signal from the first handling station, said request signal comprising data indicating that a drive unit is required by the first handling station, and further being configured to output a transport signal, upon receipt of a request signal, said transport signal comprising data indicating that a drive unit out of the plurality of drive units is to be transported to the first handling station.

According to the invention, in an arrangement for intralogistical handling of goods the storage station is adapted for storing a plurality of drive units. A drive unit is understood to be a separate component which includes an actuator, like a motor, in particular, an electrical motor. The actuator might be of another type, like a hydraulic actuator or a pneumatic actuator. A drive unit further comprises a drive coupling interface which is understood to be an interface provided at the drive unit and adapted to output drive energy out of the drive unit to another entity. Such drive energy may be a rotational force or movement, a translational force or movement, or any other type of movement, torque, or force applied by the drive unit via the drive coupling interface to another entity. The drive energy may further comprise supplying electrical energy, a hydraulic or pneumatic pressure, a fluid, or gas out of the drive unit to another entity via said drive coupling interface to provide energy to said entity for a handling step conducted in said entity. The drive unit according to the invention is stored in the storage station of the arrangement. It is understood that according to the invention the storage station may serve only to store such drive unit, and in particular store a plurality of such drive units. However, the storage station may be configured in such a way that beside the storing of drive units, a further functionality is provided by the storage station such that a handling of items could take place inside the storage station.

According to the invention, the first handling station comprises a driven coupling interface which is adapted to couple with the drive coupling interface of a drive unit. It is understood that the first handling station may comprise a plurality of such driven coupling interfaces to couple to a corresponding plurality of drive units. By this, it is possible to couple the drive unit in functional relationship to or inside the first handling station and to thus effect a handling step by a drive energy transmitted from said drive unit via said coupling. It is understood that the driven coupling interface is configured in such a way as to receive drive energy as required by the first handling station from the drive unit. The driven coupling interface may be a fully complementary interface to the drive coupling interface of the drive unit, meaning that any type of drive energy for which the drive coupling interface is capable to put that type of drive energy out is received by the driven coupling interface in that the driven coupling interface is configured to receive any such type of energy. However, the driven coupling interface may be configured in such a way that only a single or a plurality of selected ones of types of drive energy are received by the driven coupling interface wherein said selected type of energy may be selected such as to fit to the actual needs of the first handling station at the particular driven coupling interface. In such case, the driven coupling interface may only interact with single interface elements for transferring single types of energy of the drive coupling interface.

A further element of the arrangement according to the invention is a control unit which is coupled for signal transmission with the first handling station. This incorporates a counterpart to the control unit in the first handling station for conducting communication with the control unit such as, e.g., a remote control unit installed in the first handling station, a sensor installed in the first handling station and connected to a remote control unit inside or outside the first handling station which is adapted to communicate with the control unit, or the like. The control unit is adapted to receive a request signal related to the first handling station. Such a request signal includes data which at least indicates the first handling station to require a drive unit. By such a communication and type of signal it is possible that the first handling station signalizes an actual need for increased capacity and thus increased drive energy. Following such a request signal the control unit is adapted to send out a transport signal which includes information indicating that a drive unit is to be transported to the first handling station which sent out the request signal. Such a transport signal may be transmitted to a receiver installed inside the storage station such that by internal communication inside the storage station, e.g., directly to the drive units stored therein or to a transporting device for transporting the drive unit or any other type of component enabled to receive such a transport signal and to conduct a transporting step of the drive units. The transport signal may include data indicating the position to which the drive unit is to be transported like, e.g., identifying the driven coupling interface to which the drive unit shall be coupled at the first handling station and may further include related data for the transport path of the drive unit to the first handling station, data indicating the time at which the drive unit shall couple to the first handling station, data indicating the expected time of service of the drive unit inside the first handling station, data indicating the type of energy required by the first handling station from the drive unit and any further data related to the handling step to be conducted by the drive unit inside the first handling station. Upon receipt of such a transport signal, a drive unit can then be transported inside the intralogistical handling arrangement to the first handling station. The drive unit may be transported from the storage station to the first handling unit, i.e., the need is satisfied out of a reservoir of drive units stored at the storage station. The drive unit may alternatively be transported to the first handling station from another handling station inside the arrangement, e.g., a handling station wherein the drive unit is no longer required for the handling steps or the need for the drive unit inside said further handling station has a lower priority than the need for the drive unit at the first handling station.

According to the invention, a flexible distribution of drive energy inside an intralogistical arrangement is made possible by an intelligent control of the distribution, positioning, and coupling of drive units inside the arrangement. By this, it is possible to couple drive units to different driven coupling interfaces at different handling stations inside the arrangement according to the actual needs of the handling stations. The drive units can be coupled and decoupled via the drive coupling interface at the drive unit and the driven coupling interface at the handling station and can be stored in the storage station in those times where no need for a drive unit is present at the handling station. It is understood that during such storage time at the storage station the drive units may undergo maintenance operation in that the storage station comprises a maintenance coupling interface which is to be coupled to the drive coupling interface of the drive unit or another specific maintenance interface at the drive unit. By this coupling. maintenance steps like charging of the drive unit, checking the functionality of the drive unit, reading out data or updating firmware or software of the drive unit, and maintaining the hardware of the drive unit may be conducted. The drive unit may alternatively be transported from another handling station to the first handling station making it possible to exchange drive units according to the actual needs of priority inside the arrangement.

It is understood that any such drive unit may be retransferred from the first handling station to the storing station or to another handling station inside the arrangement if the drive unit is no longer required at the first handling station. Such retransfer from the first handling station may be conducted via corresponding retransfer signals transmitted from the first handling station to the storing station or to the control unit, such that the drive unit which is no longer required at the first handling station can be considered by the control unit for any other needs inside the arrangement or can be ordered to be transported to the storage station again.

Generally, it is understood that the signal transmission may be accomplished via wireless transmission or via a wire transmission in that the corresponding partners of any such signal communication have corresponding transmitters for sending and receiving such signals via a wireless or wire-bound transmission path.

The transport signal may, in a manual approach, be a signal indicating to a user the need for a drive unit at the first handling station such that the transport and coupling is conducted by the user. The transport signal, as well as the request signal, may in an automatic mode be processed in such a way that the transport of the drive unit is conducted automatically without any manual steps to be conducted by a user, e.g., by conducting the transport of the drive unit by an autonomous ground vehicle or any other transporting device or by the drive unit being configured to move autonomously to the first handling station after receipt of the transport signal.

According to a first preferred embodiment, the intralogistical arrangement is improved by further comprising a second handling station positioned in distance to the first handling station, the second handling station comprising a driven coupling interface for coupling with a drive unit out of the plurality of drive units, wherein said control unit is coupled for signal transmission with the second handling station and is configured to receive a request signal from the second handling station, said request signal comprising data indicating that a drive unit is required by the second handling station, respectively, and further being configured to output a transport signal, upon receipt of a respective request signal, said output signal comprising data indicating that a drive unit out of the plurality of drive units is to be transported from said storing station to the driven coupling interface of second handling station. According to this preferred embodiment, the arrangement further comprises a second handling station. It is understood that beside such a second handling station, additional handling stations can be included in the arrangement such that, e.g., three, four, five or even more handling stations are included and can provide the handling of items inside the arrangement. Generally, all these handling stations are understood to be in a distance to each other, i.e., any components need to be transferred from one handling station to the other if a handling at the component or item is required by the two handling stations.

A second and further handling stations may be set up identical to the first handling station, e.g., in order to increase the capacity for the functionality of this particular handling station inside the arrangement. The second handling station may alternatively be different from the first handling station such that a different handling function is effected by said second handling station and it is understood that any further handling station may be different from the first handling station and may further be different from the second handling station such that any further functionality of handling the items by said further handling station is provided inside the arrangement.

The second handling station includes one or a plurality of driven coupling interfaces adapted to be coupled with a drive coupling interface of a drive unit. By this, the second handling station can be equipped with a single or a plurality of drive units such as to effect the handling of items inside the second handling station by drive energy transferred via said coupling. Preferably, the driven coupling interface of the second handling station is identical to the driven coupling interface of the first handling station, such as, e.g., by a standardized driven coupling interface installed in the first and the second handling station. However, as described beforehand, the driven coupling interface at the second handling station may be different from the driven coupling interface of the first handling station in that the type of energy transferred via the driven coupling interface to the second handling station is different from the type of energy transferred to the first handling station.

It is generally understood that in embodiments wherein a handling station includes more than one driven coupling interface the request signal sent by a handling station and received by the control unit may further include data indicating that a drive unit coupled to one of the driven coupling interfaces inside the handling station may be transported to another driven coupling interface of the same handling station in order to fulfil the need for a specific capacity at that driven coupling interface. Further, it is to be understood that the control unit may be adapted to handle a request signal of one handling station in such a way that a drive unit which is coupled to a driven coupling interface at another handling station is decoupled therefrom, transferred to the handling station sending the request signal and coupled thereto. Such transfer of drive units inside a single handling station or between two different handling stations may be accomplished in such a way that a request signal may include data indicating a priority and wherein the control unit is configured to compare such a priority of a request signal with a present priority of a drive unit coupled to a driven coupling interface and to decide on the basis of such comparison whether the said drive unit is left in the coupled position to the driven coupling interface if the current priority at this driven coupling interface is higher than the priority of the request signal or whether the drive unit is transferred to the driven coupling interface related to the request signal if the priority of the request signal is higher than the current priority in the driven coupling interface to which the drive unit is coupled.

According to a further preferred embodiment, the arrangement is improved by further comprising a transporting device configured to mechanically engage with at least one drive unit out of the plurality of drive units and adapted to transfer said at least one drive unit from the storing station to the first handling station or, if applicable, the second handling station and vice versa and, if applicable, further adapted to be controlled by the control unit in such a way as to transfer said at least one drive unit from the storing station to the second handling station and from the first handling station to the second handling station and vice versa, wherein said control unit is adapted to control the transporting device in such a way as to transfer a drive unit or a plurality of drive units to the first handling station upon request of a request signal from said first handling station and, if applicable, to transfer a drive unit or a plurality of drive units to the second handling station upon request of a request signal from said second handling station and to transfer a drive unit from the first handling station to the second handling station. According to this embodiment, the arrangement further comprises a transporting device wherein it is understood that a plurality of transporting devices could be provided as well in the arrangement. The transporting device is configured to mechanically engage with at least one drive unit, preferably to mechanically engage with a plurality of drive units such that the drive units can be transported by said transporting device or even such that the drive units transfer drive energy to the transporting device for such transfer in that the transporting device is driven by the drive energy transferred out of the drive unit. The mechanical engagement may be accomplished via the drive coupling interface of the drive unit, in particular, in such a way that the transporting device comprises a driven coupling interface which may be similar to those of the first or the second handling station described beforehand. It is understood that the transporting device and the storing station may be integral with each other such that the storing station is embodied by the transporting device which may then take up a plurality of drive units, store these drive units temporarily and transport the drive units to any handling station inside the arrangement upon receipt of a respective transport signal. Further, a control unit may be incorporated in the transporting device or the storing station such that the control and receipt of request signals and transport signals is conducted via the control unit from said transporting device or said storing station, respectively.

The transporting device may, in particular, be a type of autonomous ground vehicle which may follow a guided path defined by markers and reference points installed inside the arrangement or which may follow a pre-program path depending on the destination via any other navigational system inside the intralogistic arrangement.

According to a preferred embodiment, the transporting device is adapted to further transfer a single or a plurality of items to be handled by the first or second handling station to the first or, if applicable, to the second handling station. According to this embodiment, the transporting device fulfils two purposes, namely, to first transport the drive units to any driven coupling interface requesting such a drive unit by a request signal and to further transport any items or good which are handled inside the arrangement. The transporting device may comprise a standardized platform to take up such items or goods and, in particular, to lock or fix the items or goods for a safe transport. In particular, the transporting device may be adapted to take up an item or good which is transferred onto the transporting device by a drive energy applied by a drive unit coupled to the item or good or to a platform whereupon the item or good is loaded, wherein the drive unit is transferred onto the transporting device and is transported together with the item or good such that the transfer from the transporting device is conducted by the drive energy of the drive unit at the destination after the transport of the drive unit together with the item or good.

It is further preferred that the transporting device is driven by a drive unit out of said plurality of drive units. By this, the transporting device receives energy like a mechanical energy as formed by, e.g., a rotational movement or a translational movement from the drive unit or may receive electrical energy to drive an actuator installed inside the transporting device from the drive unit.

Generally, it is understood that the transporting device may provide further functionality to the drive units mechanically engaged thereto like, e.g., charging of the drive units, any maintenance of the drive units, and reading out data from the drive units related to the handling of items or any other data related to the processes inside the intralogistical arrangement.

According to a further preferred embodiment, the first handling station comprises a plurality of driven coupling interfaces for coupling with a corresponding plurality of drive coupling interfaces of a corresponding plurality drive units and wherein the first handling station and the control unit are adapted to transmit and receive, respectively, a request signal comprising data indicating a number of drive units requested by the first handling station. According to this embodiment, a plurality of driven coupling interfaces are provided at a single handling station and the request signal comprises data indicating whether a single or a specific number of drive units is required by the said handling station to couple to a single or a corresponding number of driven coupling interfaces of the handling station. Further, the request signal may comprise data indicating that a drive unit has to be transferred from one driven coupling interface of said handling station to another driven coupling interface of the same handling station.

It is further preferred that the drive unit comprises a motor, preferably an electrical motor, which is coupled to the drive coupling interface of said drive unit for transmission of a mechanical force and movement from said motor to said drive coupling interface. According to this embodiment, the drive unit comprises a motor like an electrical, a hydraulic, or a pneumatic motor which is coupled to said drive coupling interface. The motor may transfer a rotational, translational, or otherwise guided movement and force to the drive coupling interface such that the motor may drive a conveyor, a lifter, a tool, or any other device having a driven coupling interface coupled to said drive unit.

It is further preferred that the motor is an electric motor and is coupled to the drive coupling interface of said drive unit for transmission of a mechanical force and movement from said drive coupling interface to said motor and to be switched to an energy recovery mode, wherein said motor is driven as a generator to convert said mechanical force and movement into electrical energy, wherein the drive coupling interface is preferably adapted to transfer said electrical energy to a driven coupling interface coupled thereto. According to this embodiment, the motor may switch into a generator mode, wherein energy is recovered from a mechanical input at the drive coupling interface and is converted into electrical energy. This may be employed in applications where frequent acceleration and deceleration of loads takes place and in such case the energy set free in deceleration process may be converted into electrical energy. The electrical energy may be stored inside the drive unit for use in a subsequent acceleration process or may be transferred into a private or public network coupled to the drive unit via the drive coupling interface.

It is further preferred that the drive unit comprises a source of electrical energy, wherein the drive coupling interface is configured to establish an electrical connection for transferring electrical energy from the source of electrical energy of the drive unit to the first handling station or the second handling station, respectively. According to this embodiment, the drive unit serves as a sort of mobile power package in that electrical energy is stored inside the drive unit by, e.g., a battery, a rechargeable battery, or the like. By this, energy can be installed inside the arrangement at a specific handling station or a specific driven coupling interface and thus supplied at this position to drive any handling process of items in the handling station. The source of electrical energy may in particular be rechargeable such that the drive unit may be recharged, e.g., at the storage station or the transporting device, if applicable, but in specific embodiments it may be preferable that a single or a plurality of handling stations are equipped such that a driven coupling interface or all driven coupling interfaces of the said handling station(s) is adapted to charge a drive unit coupled thereto.

According to a further preferred embodiment, it is preferred that a first drive unit out of said plurality of drive units comprises a driven coupling interface adapted to couple with a drive coupling interface of a second drive unit out of said plurality of drive units. According to this embodiment, a drive unit is adapted to be coupled to another drive unit in that the drive coupling interface of the other drive unit is coupled to a driven coupling interface of the first drive unit. The driven coupling interface may be configured in the same way as the driven coupling interfaces installed at the handling stations, but may alternatively be specifically configured for the purpose of the specific coupling of two drive units. By such coupling of two drive units, the capacity provided by the drive units is increased and it is possible to provide an increased capacity at one driven coupling interface of a handling station. For example, the electrical energy provided by two such coupled drive units may be doubled in that a higher voltage or a higher current is provided or in that the energy supply is maintained over a longer time. Further, the torque or speed of a mechanical movement could be increased by such coupling of two drive units. It is understood that a driven coupling interface may be provided at the second drive unit as well, such that the second drive unit could be coupled to a third drive unit and that by such systematic and identical drive units a plurality of drive units could be coupled to each other to provide a serial or a parallel supply of energy at a single driven coupling interface of a handling station.

It is then particularly preferred that a coupling established by said drive coupling interface of said second drive unit and said driven coupling interface of said first drive unit is adapted to transfer electrical energy from said second drive unit to said first drive unit, mechanical energy, in particular, a rotational movement or a translational movement from said second drive unit to said first drive unit, and/or control data for controlling said first and second drive unit. According to this embodiment, the coupling of the two or more drive units to each other allows to transfer the specific type of energy which is to be transferred to a driven coupling interface at a handling station. It is understood that the coupling of two drive units may, in particular, be configured such that all type of energy and data is transferable via said coupling such that the package of two or more drive units can universally be coupled to any driven coupling interface at a handling station to provide the required specific type of energy and data for said driven coupling interface in the handling station.

Still further it is preferred that first drive unit is adapted to output via its drive coupling interface a sum of electrical and/or mechanical energy provided by said first drive unit and said second drive unit. According to this embodiment, the package of two or more drive units coupled to each other provides an increased energy of the specific type of energy in that the sum of the energy of the drive units coupled to such a package is provided at a drive coupling interface of said package to be transferred to a driven coupling interface of a handling station. It is understood that such a sum may be formed as a serial or parallel addition of the energy of the single drive units in the package. It is further understood that the coupling interfaces of the drive units may be adapted to selectively provide a serial or parallel addition of a specific type of energy, e.g., it could be realized that four drive units are coupled to a package wherein the electrical energy supplied by each drive unit is 24 V and added to be 48 V by the package, wherein two of the drive units are formed as a parallel coupling of the voltages and said parallel package is coupled for a serial package for increasing the current or time of energy supply of the whole package.

According to a preferred embodiment, said drive unit out of said plurality of drive units comprises an electronic data storage adapted to receive navigational data indicating a destination selected from said first handling station, said storage station, said second handling station, if applicable, and wherein said drive coupling interface of said drive unit is adapted to output data incorporating steering commands, electrical energy, and/or mechanical energy based on said navigational data. According to this embodiment, the drive unit is equipped with an electronic data storage and the drive coupling interface of the drive unit includes the capability to output data related to such navigational data and to further preferably output any energy on the basis of such navigational data. By this embodiment, the drive unit may either serve to control the transfer from a storing station to a handling station or from a first driven coupling interface to a second driven coupling interface inside a single handling station or between two different handling stations such that respective navigational data is transferred via the drive coupling interface of the drive unit. Further, electrical energy or mechanical energy or both may be provided at the drive coupling interface of the drive unit on the basis of such navigational data such that the drive energy is started, stopped, increased, or decreased according to the path defined by the navigational data. By this, the guidance of the drive unit to its destination, namely, to the driven coupling interface, is completely or partly controlled by said drive unit itself.

According to a further preferred embodiment, the drive units out of said plurality of drive units are built up identical. According to this embodiment, the arrangement comprises a plurality of drive units and all these drive units are identical. It is understood that such identical drive units may in particular have identical drive coupling interfaces and, if applicable, identical driven coupling interfaces. Further, the drive units may have identical motors or actuators with identical drive speeds, drive forces, torques, or the like. It is understood that two drive units are identical in the meaning of the invention even if the capacity of an energy storage of the drive unit is different such that drive units having identical mechanical properties and coupling capacities may however differ in that the amount of energy to be stored could be different for the identical drive units.

It is further preferred that the driven coupling interface of the first handling station is configured to couple said drive coupling interface of said drive unit to a conveyor device comprised in the first handling station in such a way that the conveyor device is driven by the drive unit. According to this embodiment, the drive unit serves to convey items or goods inside the handling station if coupled to the driven coupling interface of the handling station. This conveying of goods by the drive unit may either be in a horizontal direction, in a transverse direction to the horizontal direction, or in a vertical direction, as a lifting of the items. It is understood that a plurality of drive units may be coupled to a corresponding plurality of driven coupling interfaces at the handling station thus effecting a conveying of the items in different directions, different sections of the handling station and, e.g., interacting with each other such that by a combination of longitudinal, transversal or vertical conveying a sorting of the items is accomplished.

According to a further preferred embodiment, the driven coupling interface of the first and/or the second handling station is configured to fix the drive unit in a stationary arrangement in relation to the first or second handling station, respectively, and to transfer a driving motion from the drive unit for conveying goods inside the first or second handling station, respectively. According to this embodiment, the drive unit is stationary in a handling station and effects a driving force for conveying items inside the handling station. Such an arrangement could be realized in such a way that the coupling of the drive coupling interface of the drive unit and the driven coupling interface of the handling station effects a fixing of the position of the drive unit and transfers a rotational movement, a supply of electrical energy, or a translational movement from the drive unit to the handling station, e.g., by providing a mashing of a tooth gear at the drive coupling interface with a corresponding tooth gear at the driven coupling interface.

According to a further preferred embodiment, the driven coupling interface of the first and/or second handling station is configured to position the drive unit stationary to a moving unit which is part of the first or second handling station, respectively, wherein said moving unit is moved inside the first or second handling station, respectively, by a driving force supplied from said driving unit coupled to said driven coupling interface. According to this preferred embodiment, the drive unit is not fixed in a stationary arrangement inside the handling station, but is moved inside the handling station in that the drive unit is stationary fixed to a moving unit like, e.g., a transport platform or frame or any other type of docking unit for engaging with an item or a plurality of items to be conveyed and effects the conveying of said moving unit inside the handling station. The moving unit and/or the drive unit coupled thereto may be guided along a guiding path inside the handling station. Again, the drive unit may supply mechanical energy to directly drive the moving unit or may supply electrical energy to supply an actuator which is part of the moving unit with such energy.

It is further preferred that said first handling station is configured to effect a lifting movement of an item by said drive unit coupled to the driven coupling interface of said first handling station within said first handling station, to effect a horizontal translational movement of an item by said drive unit coupled to the driven coupling interface of said first handling station within said first handling station, to effect a manufacturing step at an item by said drive unit coupled to the driven coupling interface of said first handling station within said first handling station, to effect an assembling step at an item by said drive unit coupled to the driven interface of said first handling station within said first handling station, and/or to effect a packaging step of an item by said drive unit coupled to the driven interface of said first handling station within said first handling station.

According to this preferred embodiment, the first handling station is configured to provide one or a plurality of handling steps to a single or a plurality of items inside the handling station. It is understood that any other second or further handling station may be configured to accomplish any such handling step in the same way as the first handling station or may be configured to accomplish any of said handling step differently from the first handling station.

It is further preferred that said control unit is configured to receive a failure signal indicating that a first drive unit installed in a handling station has a failure, wherein said failure signal is sent by said first drive unit out of said plurality of drive units or from said handling station, wherein said control unit is further adapted to send out a failure compensate signal comprising data indicating that a second drive unit is to be moved to said drive unit having a failure. Said second drive unit in such case is adapted to engage said first drive unit such as to replace the function of the first drive unit with the first drive unit keeping coupled to the handling station, said second drive unit is adapted to replace said first drive unit by removing said first drive unit out of the coupling to said handling station and to hereafter couple via said drive coupling interface of the second drive unit to the handling station.

Said second drive unit may also be adapted to engage in a first step said first drive unit such as to replace the function of the first drive unit with the first drive unit keeping coupled to the handling station, and to replace in a second step after the first step said first drive unit by removing said first drive unit out of the coupling to said handling station and to hereafter couple via said drive coupling interface of the second drive unit to the handling station.

According to this embodiment, the control unit and the drive units are adapted to handle a case of failure of a single drive unit in such a way that no significant delay in the handling of items will occur in the arrangement. To this regard, the control unit is configured to receive a failure signal which indicates that a failure is present at a drive unit. The failure signal may be sent by the failed drive unit itself or by any other entity detecting such failure like, e.g., a handling station wherein said failed drive unit is coupled to a driven coupling interface. Upon receipt of such failure signal, the control unit initiates transport of a second drive unit to the failed drive unit. This second drive unit may either directly replace the failed drive unit such that the failed drive unit is decoupled from the driven coupling interface and the second drive unit couples to said driven coupling interface. In some situations however, it may not be possible to decouple the failed drive from the driven coupling interface. In such situations, the second drive unit may engage the failed drive unit, e.g., by coupling the drive coupling interface of the second drive unit to a driven coupling interface of the failed drive unit, and then fulfil the function of the failed drive unit. In this case, the failed drive unit will stay coupled to the driven coupling interface. In a further situation, a very quick reaction and restoration of the function of the failed drive unit may be required such that a decoupling of the failed drive unit and coupling of the second drive unit is not possible at the time. In such urgent situations, the second drive unit may engage the failed drive unit and fulfil the function as described beforehand any may later replace said failed drive unit by decoupling and new coupling as initially described.

It is further preferred that said drive coupling interface is configured to couple to a first driven coupling interface with a first section of said drive coupling interface and to transfer energy via said first section to said first driven coupling interface, or to couple to said first driven coupling interface with a second section of said drive coupling interface and to transfer energy via said second section to said first driven coupling interface, wherein said second section is arranged in a distance to said first section and said first and second section are preferably arranged in a mirror-symmetrical arrangement about a plane running through said drive coupling interface, or to couple to said first driven coupling interface with said first section of said drive coupling interface and to transfer energy via said first section to said first driven coupling interface, to simultaneously couple to a second driven coupling interface with said second section of said drive coupling interface, and to transfer energy via said second section to said second driven coupling interface.

According to this embodiment, the drive coupling interface is adapted for an at least two-sided coupling to either a single driven coupling interface at one side or the other side or to two driven coupling interfaces simultaneously. This is accomplished by two sections provided at the drive coupling interface, each section being adapted for coupling with a driven coupling interface. The sections may be arranged in a side-by-side arrangement or may be arranged opposed to each other, e.g., in a mirror-symmetrical arrangement with respect to a mirror plane running through the drive coupling interface. Each section may provide the full functionality such as transfer of mechanical or electrical drive energy, data transfer and the like.

It is further preferred that said drive unit comprises a transport element, said transport element being adapted to exert a driving force onto a ground surface, a transfer plane or a guiding element, and to move said drive unit via said driving force, in particular to move said drive unit from said storage station to said first handling station or vice versa, from said first handling station to another handling station or vice versa, from said storage station, said first handling station, or said another storage station onto a transport device adapted to transport said drive unit, wherein said transporting device is preferably configured according to the transporting device which was described beforehand.

According to this embodiment, the drive unit is self-driven by a transport element incorporated in the drive unit. The transport element may comprise a wheel or a caterpillar tread or the like for frictional transmission of a driving force for moving said drive unit. The drive unit may be transferred on a floor between the handling stations, on a guiding installation, on a separate transfer plane, or the like.

It is further preferred that the transport element is driven by said motor. The transport element may be adapted to transfer the driving force and to fulfil a guiding function. In particular, the transport element may be coupled to a motor incorporated in the drive unit such that the drive unit is moved by the driving force of this motor, wherein said motor is further coupled to the drive coupling interface such as to provide the driving force at this interface.

A further aspect of the invention is a method of handling items in an intralogistical handling process, characterized by the steps of sending a request from a first handling station to a control unit, after having received said request by said control unit sending a transfer instruction from said control unit to a first drive unit stored in a storage station, transferring said first drive unit from said storage station to said first handling station according to said transfer instruction received by said first drive unit, coupling said drive unit via a drive interface provided at said first drive unit to a driven interface provided at said first handling station, transmitting energy via said coupled drive and driven interface, and handling of an item inside said first handling station by said drive energy. The method can be further improved in that said transmitting of energy comprises transmitting electrical energy and/or transmitting mechanical energy, in particular, a rotational movement or a translational movement.

The method can be further improved in that said handling of an item comprises a lifting movement of an item by said drive unit coupled to the driven interface of said first handling station within said first handling station, a horizontal translational movement of an item by said drive unit coupled to the driven interface of said first handling station within said first handling station, a manufacturing step at an item by said drive unit coupled to the driven interface of said first handling station within said first handling station, an assembling step at an item by said drive unit coupled to the driven interface of said first handling station within said first handling station, and/or a packaging step of an item by said drive unit coupled to the driven interface of said first handling station within said first handling station.

Finally, a further aspect of the invention is an electrical motor, a drive interface, an electrical energy storage connected for electrical energy transmission to said electrical motor, a control unit adapted to receive control data for controlling said electrical motor, wherein said drive interface is adapted to transfer a drive energy from said electrical motor to a driven interface coupled to said drive interface, to transmit control data sent or to be received by said control unit, and to mechanically engage with a driven interface for stationary locking said drive unit or for guiding said drive unit along a predetermined path. The so defined drive unit is specifically adapted to be used in an arrangement for intralogistical handling of items. In this use the drive unit is transferred inside the arrangement in such a way as to be coupled by its drive coupling interface to a driven coupling interface at a handling station and to then supply mechanical energy, electrical energy or any other type of energy and/or data to the handling station via said coupling. The drive unit may further be configured to receive data via said drive coupling interface such that the drive unit is controlled via data received from outside over said drive coupling interface.

The drive unit may be further improved in that said drive interface is adapted to transfer a mechanical drive energy for moving said drive unit.

Still further, the drive unit may be further improved in that said drive interface is adapted to transfer a electrical energy from said electrical energy storage and to transmit electrical energy for charging said electrical energy storage.

The invention is further described in detail with reference to preferred embodiments shown in the figures.

DETAILED DESCRIPTION OF THE EMBODIMENTS

In the Figures, the same or corresponding elements or units are each provided with the same and/or the corresponding reference signs. When an element or a unit has already been described with reference to a particular Figure, a detailed description is dispensed with when discussing another Figure. However, it is to be understood that the present disclosure may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise. The drawings referenced herein are schematic and associated views thereof are not necessarily drawn to scale.

Figure 1:
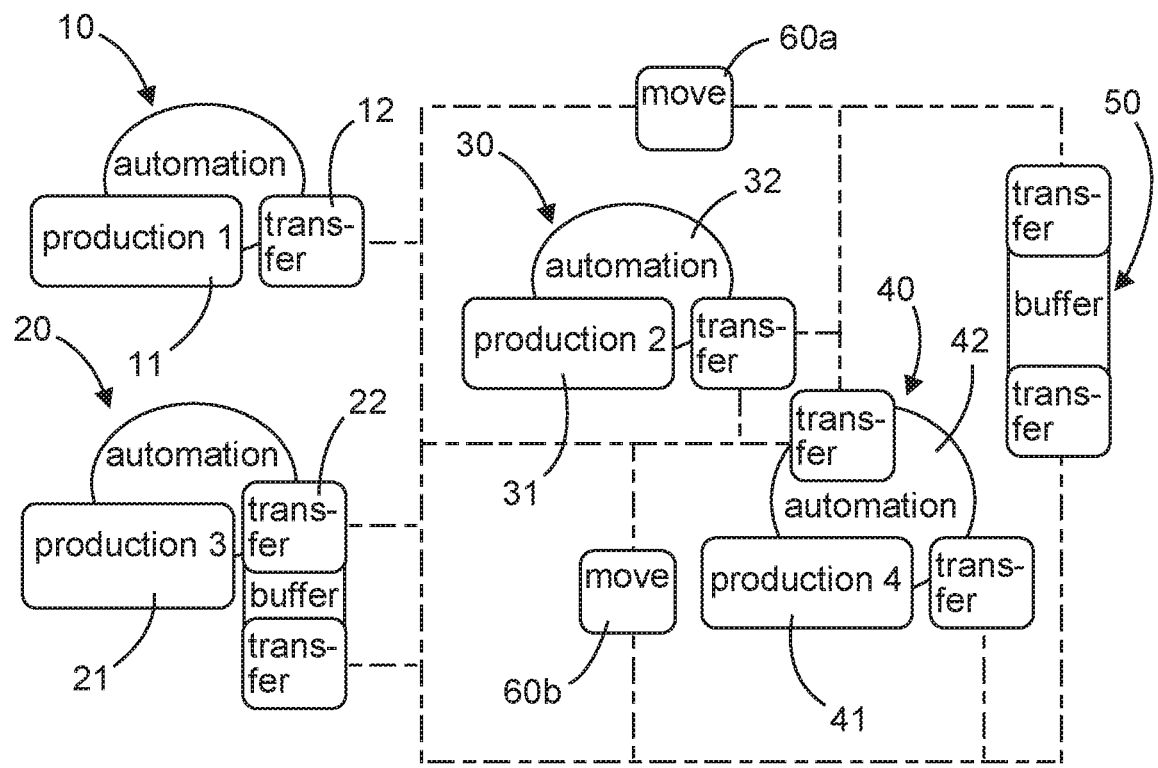
FIG. 1 is a schematical setup of an arrangement for intralogistical handling according to a first preferred embodiment.

Making reference to FIG. 1, an intralogistic arrangement for handling items is schematically depicted therein. The arrangement comprises a total of four handling stations 10, 20, 30, 40 wherein items can be automatically handled to accomplish different production and assembling steps at the items. Each handling station 10, 20, 30, 40 comprises a handling place 11, 21, 31, 41 and an automated transfer place 12, 22, 32, 42. The manufacturing place is adapted to conduct a manufacturing or assembling step like, e.g., attaching two items to each other, packaging a plurality of items, mechanically working the items by, e.g., drilling, milling, turning or the like, welding, soldering, measuring, or any other typical manufacturing or assembling step. The transfer place 12, 22, 32, 42 serves to input and output items to the manufacturing place 11, 21, 31, 41. This can be done by a single transfer place as in handling station 10 and 30, by two transfer places as in a handling station 40, or by a transfer place including a buffer for temporarily storing items as in handling station 20.

The arrangement further comprises a separate buffer 50 which is position in a distance to the four handling stations 10, 20, 30, 40. This buffer serves to temporarily store items to allow control and timely supply of the items to the different handling station.

In FIG. 1, the transfer paths of the items by moving platforms 60a, 60b are shown in dotted lines. Along these paths, the items to be processed in the handling stations or to be buffered in the buffer station are transferred inside the intralogistic arrangement.

Figure 2:
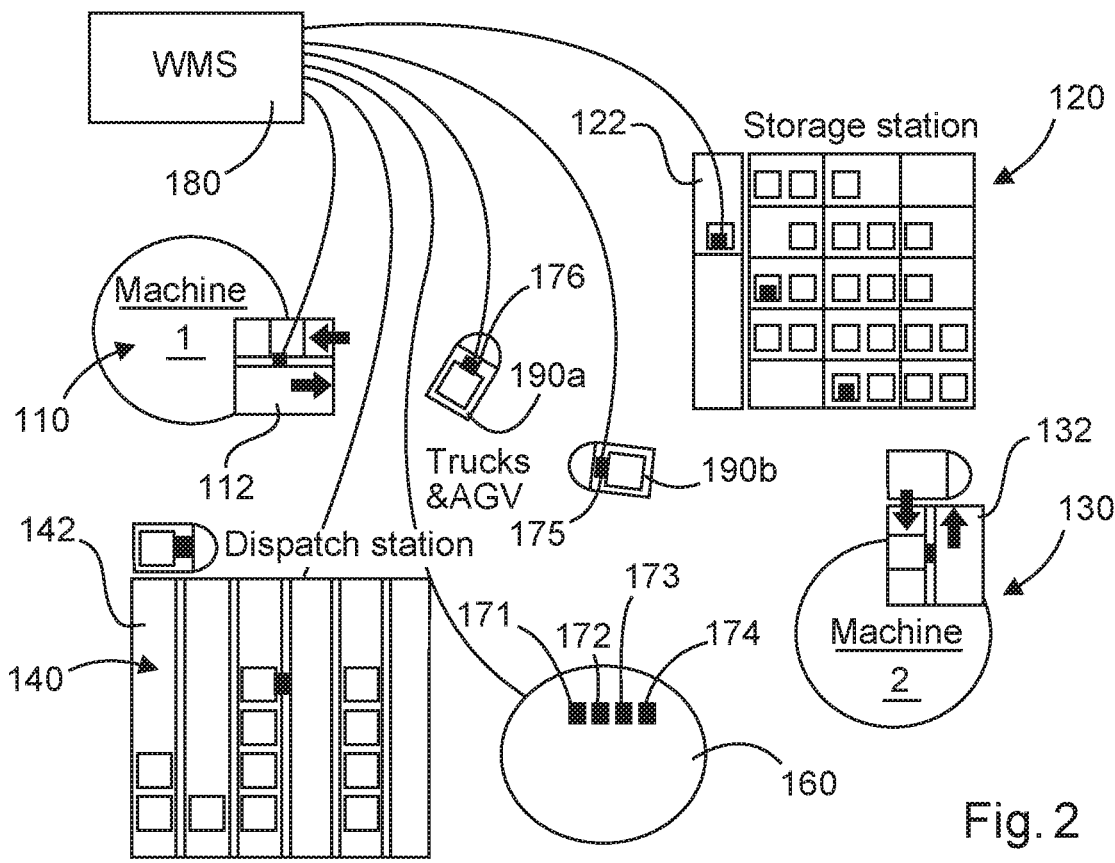
FIG. 2 is a schematical setup of a arrangement for intralogistical handling according to a second preferred embodiment

FIG. 2 shows a schematical setup of an intralogistical arrangement comprising a first handling station 110, a second handling station 120, a third handling station 130, and a fourth handling station 140. The first handling station 110 and the third handling station 130 are configured for conducting a manufacturing or assembling step at an item. For this purpose, a transfer unit 112, 132 is provided at these handling stations 110, 130 to input or output items to these handling stations.

The second handling station 120 is configured as a storage station and serves to temporarily store items inside the intralogistical arrangement. The storage station is equipped with a transfer unit 122 to put items into the storage station or to put items out of the storage station. The transfer unit 122 is able to lift the items onto a certain level to keep the storage of the items in a sorted arrangement.

The fourth handling station 140 is configured as a dispatch station and comprises a transfer unit 142. The transfer unit 142 is arranged for a horizontal movement to sort and distribute the items provided to the fourth handling station 140. The items are sorted in a plurality of columns and can be dispatched into and from the columns according to a first in first out principle.

Further, a drive unit storage station 160 is provided in the intralogistical arrangement of FIG. 2. This storage station 160 serves to temporarily store a plurality of drive units 171, 172, 173, 174.

The storage station 160 for drive units and the four handling stations 110, 120, 130, 140 are coupled for signal transmission to a control unit 180. The control unit 180 is adapted to receive and send signals from the handling stations 110, 120, 130, 140. The control unit 180 further has a wireless signal transmission path to a number of autonomous ground vehicles (AGV) 190a, b. The AGV serves to transport items and drive units as depicted by drive units 175, 176 for conducting a transfer between the storage station 160 and the handling station 110, 120, 130, 140. By the signal transmission paths a request signal from the handling stations 110, 120, 130, 140 can be transferred to the control unit 180 and may be processed therein to initiate a transfer of a drive unit to the requesting handling station by a transport signal. Further, a request signal may include information that a drive unit is no longer required in the handling station such that the control unit 180 may process such a request signal to send a transport signal to one of the AGVs signalising to fetch said drive unit at said handling station and transport the drive unit to another handling station or to the storage station 160.

A basic functionality of conveying the items in the arrangement according to FIG. 2 is such that any item is positioned on a moving platform to which a drive unit can be coupled via a driven coupling interface at the moving platform. By this, the moving platform can be conveyed with an item disposed thereon to accomplish the conveying action of such an item as in input feed or output feed of a handling station from or to an AGV. Further, by said drive unit coupled to a moving platform onto which an item is disposed the item can be positioned inside a handling station by a conveying action effected by the drive unit. After the item has been positioned, the drive unit may decouple from the moving platform and may be taken up by an AGV to be transported to another place for another purpose.

Figure 3:
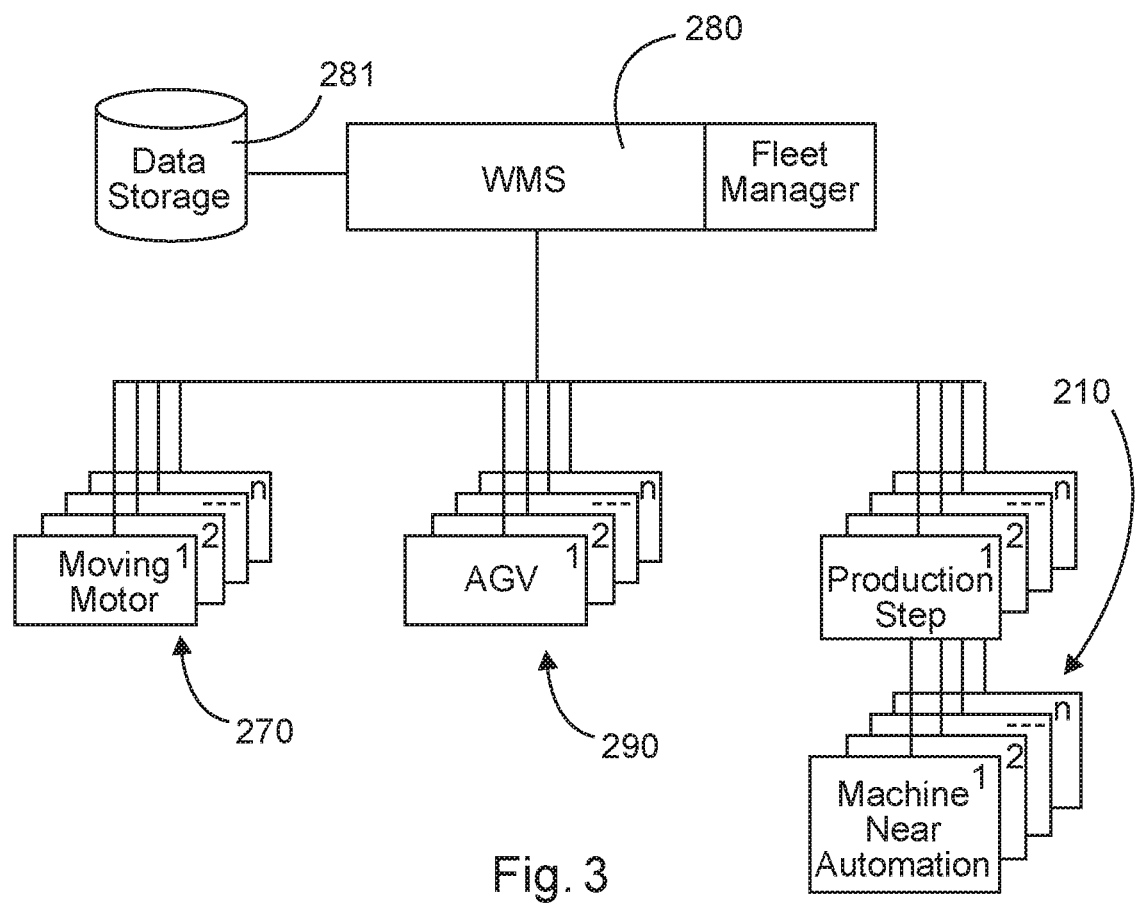
FIG. 3 is a control scheme for an arrangement for intralogistical handling of items according to a third preferred embodiment.

FIG. 3 shows a general setup of the data control system of an arrangement of intralogistic handling of items. As can be seen, a central control unit 280 is provided which is coupled to a data storage 281 wherein process data, quality measurements, configuration data, and the like may be stored. The control unit 280 is coupled for signal transmission to a number of moving motors 270, a number of AGVs 290, and a number of handling stations 210. By this, relevant data, like request signals or transport signals, can be exchanged between the different stations and the control unit 280, and the control unit 280 is able to process such data and to send out corresponding signals to control the process of delivery and transport of drive units inside the arrangement.

Figure 4:
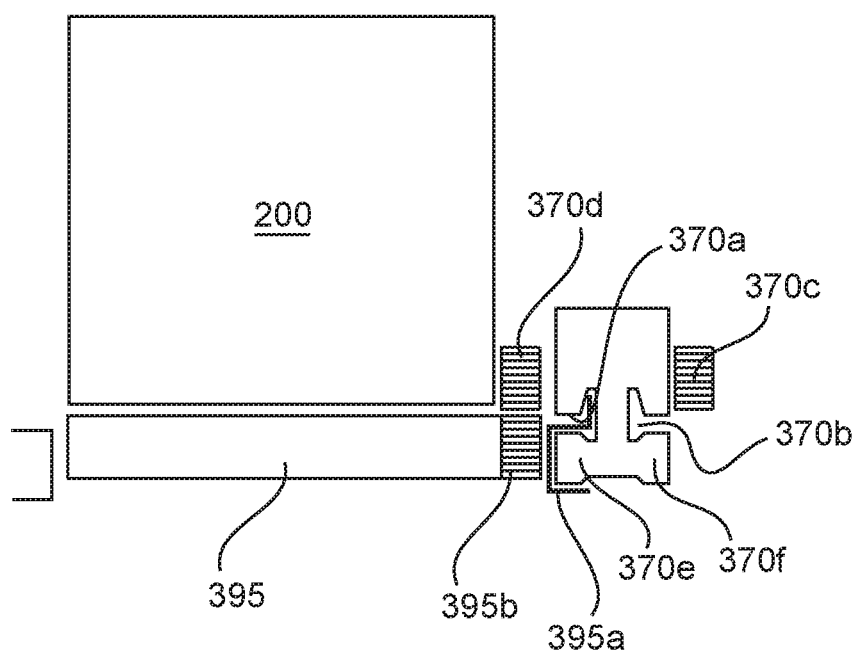
FIG. 4 is a frontal sectional view of a drive unit inside a handling station.

FIG. 4 shows a schematic view of a design of a drive unit coupled to a handling station. The drive unit 370 comprises a drive coupling interface which comprises first section having a structured recess 370a and a toothed gearwheel 370d and a second section having a structured recess 370b which is mirror symmetrical to the structured recess 370a and a toothed gearwheel 370c which is mirror symmetrical to the toothed gearwheel 370d. The such defined first section of the drive coupling interface is shown in a coupled condition to a driven coupling interface composed of a frame profile 395a and a toothed gearwheel 395b. The frame profile 395a has a congruent shape like recess 370a. By this, a form locking of the drive unit is achieved at the frame profile 395a via said recess 370a. This form locking engagement allows the drive unit to move along the frame profile. The drive unit may lock itself by frictional engagement of a head 370e or a head 370f which is part of the drive coupling interface at a specific position along the frame profile 395a. In such a predetermined position, the toothed gearwheel 370d meshes with the toothed gearwheel 395b, such that a rotational movement can be transferred from the drive unit to the handling station. By this, a roller 395, which is part of a conveyor zone for carrying items 200, can be set into rotation such that item 200 is conveyed along said conveying zone.

Alternatively or additionally, a further driven coupling interface may be coupled to the second section of the drive coupling interface. By this, the drive unit may simultaneously drive two different devices or may provide two different or two identical functions to a handling station via said two sections of the drive coupling interface. It will be understood that any described processes or steps within described processes may be combined with other disclosed processes or steps to form structures within the scope of the present disclosure. The exemplary structures and processes disclosed herein are for illustrative purposes and are not to be construed as limiting.

It will be understood by one having ordinary skill in the art that construction of the present disclosure and other components is not limited to any specific material. Other exemplary embodiments of the disclosure disclosed herein may be formed from a wide variety of materials, unless described otherwise herein.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It is also to be understood that variations and modifications can be made on the aforementioned structures and methods without departing from the concepts of the present invention, and further it is to be understood that such concepts are intended to be covered by the following claims unless these claims by their language expressly state otherwise.

The invention claimed is:

1. An arrangement for intralogistical handling of items, comprising:
    a storage station for storing a plurality of drive units, each drive unit comprising a drive coupling interface and each drive unit comprises a motor coupled to the drive coupling interface of the drive unit for transmission of a mechanical force and movement from the motor to the drive coupling interface;
    a first handling station positioned in distance to the storage station, said first handling station comprising a driven coupling interface for coupling to said drive coupling interface of a drive unit out of the plurality of drive units, wherein the driven coupling interface is arranged stationary at the first handling station; and
    a control unit is-coupled for signal transmission with the first handling station and configured to receive a first request signal from the first handling station, the first request signal comprising data indicating that a drive unit is required by the first handling station, and further being configured to output a transport signal, upon receipt of the first request signal, the transport signal comprising data indicating that a drive unit out of the plurality of drive units is to be transported to the first handling station.

2. The arrangement pursuant to claim 1, further comprising:
    a second handling station positioned in distance to the first handling station, the second handling station comprising a driven coupling interface for coupling with a drive unit out of the plurality of drive units, wherein the control unit is coupled for signal transmission with the second handling station and is configured to receive a second request signal from the second handling station;
    the second request signal comprising data indicating that a drive unit is required by the second handling station, respectively, and further being configured to output a transport signal, upon receipt of a respective second request signal, said output signal comprising data indicating that a drive unit out of the plurality of drive units is to be transported from said storing station to the driven coupling interface of second handling station.

3. The arrangement pursuant to claim 2, further comprising:
    a transporting device configured to mechanically engage with at least one drive unit out of the plurality of drive unit and adapted to transfer the at least one drive unit from the storing station to the first handling station or the second handling station, and vice versa, and further adapted to be controlled by the control unit in such a way as to transfer the at least one drive unit from the storing station to the second handling station and from the first handling station to the second handling station and vice versa;
    wherein the control unit is adapted to control the transporting device in such a way as to transfer a drive unit or a plurality of drive units to the first handling station upon request of the first request signal from the first handling station and to transfer a drive unit or a plurality of drive units to the second handling station upon request of the second request signal from the second handling station and to transfer a drive unit from the first handling station to the second handling station.

4. The arrangement pursuant to claim 3,
    wherein the transporting device is adapted to further transfer a single or a plurality of items to be handled by the first or second handling station to the first or to the second handling station.

5. The arrangement pursuant to claim 3, wherein the transporting device is driven by a drive unit out of said plurality of drive units.

6. The arrangement pursuant to claim 1, wherein the first handling station comprises a plurality of driven coupling interfaces for coupling with a corresponding plurality of drive coupling interfaces of a corresponding plurality drive units and wherein the first handling station and the control unit are adapted to transmit and receive, respectively, a request signal comprising data indicating a number of drive units requested by the first handling station.

7. The arrangement pursuant to claim 1, wherein the motor is an electric motor and is coupled to the drive coupling interface of said drive unit for transmission of the mechanical force and movement from the drive coupling interface to the motor and to be switched to an energy recovery mode, wherein the motor is driven as a generator to convert the mechanical force and movement into electrical energy.

8. The arrangement pursuant to claim 7, wherein the drive coupling interface is adapted to transfer the electrical energy to a driven coupling interface coupled thereto.

9. The arrangement pursuant to claim 1, wherein the drive unit comprises a source of electrical energy, and wherein the drive coupling interface is configured to establish an electrical connection for transferring electrical energy from the source of electrical energy of the drive unit to the first handling station or a second handling station, respectively.

10. The arrangement pursuant to claim 1, further comprising:
a first drive unit out of the plurality of drive units comprises a driven coupling interface adapted to couple with a drive coupling interface of a second drive unit out of said plurality of drive units.

11. The arrangement pursuant to claim 10, further comprising:
a coupling established by the drive coupling interface of said second drive unit, wherein the driven coupling interface of the first drive unit is adapted to transfer electrical energy from said second drive unit to said first drive unit.

12. The arrangement pursuant to claim 10, further comprising:
a coupling established by the drive coupling interface of said second drive unit, wherein the driven coupling interface of the first drive unit is adapted to transfer mechanical energy in the form of rotational movement or translational movement from said second drive unit to said first drive unit.

13. The arrangement pursuant to claim 10, further comprising:
a coupling established by the drive coupling interface of said second drive unit, wherein the driven coupling interface of the first drive unit is adapted to transfer control data for controlling said first and second drive unit.

14. The arrangement pursuant to claim 9, wherein the first drive unit is adapted to output via its drive coupling interface a sum of mechanical energy provided by said first drive unit and said second drive unit.

15. The arrangement pursuant to claim 1, wherein the drive unit out of said plurality of drive units comprises an electronic data storage adapted to receive navigational data indicating a destination selected from the first handling station, the storage station, or the second handling station; and
wherein the drive coupling interface of said drive unit is adapted to output data incorporating steering commands, electrical energy, or mechanical energy based on said navigational data.

16. The arrangement pursuant to claim 1, wherein the drive units out of the plurality of drive units are built up identical.

17. The arrangement pursuant to claim 1, wherein the driven coupling interface of the first handling station is configured to couple the drive coupling interface of the drive unit to a conveyor device comprised in the first handling station in such a way that the conveyor device is driven by the drive unit.

18. The arrangement pursuant to claim 2, wherein the driven coupling interface of the first or the second handling station is configured to fix the drive unit in a stationary arrangement in relation to the first or second handling station, respectively, and to transfer a driving motion from the drive unit for conveying goods inside the first or second handling station, respectively.

19. The arrangement pursuant to claim 2, wherein the driven coupling interface of the first or second handling station is configured to position the drive unit stationary to a moving unit which is part of the first or second handling station, respectively; and
wherein the moving unit is moved inside the first or second handling station, respectively, by a driving force supplied from said driving unit coupled to said driven coupling interface.

20. The arrangement pursuant to claim 1, wherein the first handling station is configured to effect a lifting movement of an item by said drive unit coupled to the driven coupling interface of said first handling station within said first handling station.

21. The arrangement pursuant to claim 1, wherein the first handling station is configured to effect a horizontal translational movement of an item by said drive unit coupled to the driven coupling interface of said first handling station within said first handling station.

22. The arrangement pursuant to claim 1, wherein the first handling station is configured to effect a manufacturing step at an item by said drive unit coupled to the driven coupling interface of said first handling station within said first handling station.

23. The arrangement pursuant to claim 1, wherein the first handling station is configured to effect an assembling step at an item by said drive unit coupled to the driven interface of said first handling station within said first handling station.

24. The arrangement pursuant to claim 1, wherein the first handling station is configured to effect a packaging step of an item by said drive unit coupled to the driven interface of the first handling station within the first handling station.

25. The arrangement pursuant to claim 1, wherein the control unit is configured to receive a failure signal indicating that a first drive unit installed in a handling station has a failure, wherein said failure signal is sent by said first drive unit out of said plurality of drive units or from said handling station, and wherein said control unit is further adapted to send out a failure compensate signal comprising data indicating that a second drive unit is to be moved to said drive unit having a failure; and
wherein the second drive unit is adapted to engage said first drive unit such as to replace the function of the first drive unit with the first drive unit keeping coupled to the handling station.

26. The arrangement pursuant to claim 1, wherein the control unit is configured to receive a failure signal indicating that a first drive unit installed in a handling station has a failure, wherein said failure signal is sent by said first drive unit out of said plurality of drive units or from said handling station, and wherein said control unit is further adapted to send out a failure compensate signal comprising data indicating that a second drive unit is to be moved to said drive unit having a failure; and
the second drive unit is adapted to replace the first drive unit by removing said first drive unit out of the coupling to the handling station and to hereafter couple via the drive coupling interface of the second drive unit to the handling station.

27. The arrangement pursuant to claim 1, wherein the control unit is configured to receive a failure signal indicating that a first drive unit installed in a handling station has a failure, wherein said failure signal is sent by said first drive unit out of said plurality of drive units or from said handling station, and wherein said control unit is further adapted to send out a failure compensate signal comprising data indicating that a second drive unit is to be moved to said drive unit having a failure; and the second drive unit is adapted to engage in a first step the first drive unit such as to replace the function of the first drive unit with the first drive unit keeping coupled to the handling station, and to replace in a second step after the first step said first drive unit by removing the first drive unit out of the coupling to the handling station and to hereafter couple via said drive coupling interface of the second drive unit to the handling station.

28. The arrangement pursuant to claim 1, wherein the drive coupling interface is configured to couple to a first driven coupling interface with a first section of the drive coupling interface and to transfer energy via the first section to the first driven coupling interface.

29. The arrangement pursuant to claim 1, wherein the drive coupling interface is configured to couple to the first driven coupling interface with a second section of the drive coupling interface and to transfer energy via the second section to the first driven coupling interface, wherein the second section is arranged in a distance to the first section and the first and second section are arranged in a mirror-symmetrical arrangement about a plane running through the drive coupling interface.

30. The arrangement pursuant to claim 1, wherein the drive coupling interface is configured to couple to the first driven coupling interface with the first section of the drive coupling interface and to transfer energy via the first section to the first driven coupling interface, to simultaneously couple to a second driven coupling interface with the second section of the drive coupling interface, and to transfer energy via the second section to the second driven coupling interface.

31. The arrangement pursuant to claim 1, wherein the drive unit comprises a transport element;

wherein the transport element is adapted to exert a driving force onto a ground surface, a transfer plane or a guiding element, and to move said drive unit via the driving force, so as to move said drive unit from said storage station to said first handling station or vice versa, from said first handling station to another handling station or vice versa, and from said storage station, said first handling station or said another storage station onto a transporting device adapted to transport said drive unit;

wherein said transporting device is configured to mechanically engage with at least one drive unit out of the plurality of drive unit and adapted to transfer the at least one drive unit from the storing station to the first handling station or the second handling station, and vice versa, and further adapted to be controlled by the control unit in such a way as to transfer the at least one drive unit from the storing station to the second handling station and from the first handling station to the second handling station and vice versa; and wherein the control unit is adapted to control the transporting device in such a way as to transfer a drive unit or a plurality of drive units to the first handling station upon request of the first request signal from the first handling station and to transfer a drive unit or a plurality of drive units to the second handling station upon request of the second request signal from the second handling station and to transfer a drive unit from the first handling station to the second handling station.

32. The arrangement pursuant to claim 31, wherein the drive unit comprises a motor coupled to the drive coupling interface of said drive unit for transmission of a mechanical force and movement from said motor to said drive coupling interface; and the transport element is driven by said motor.

33. A method of handling items in an intralogistical handling process, comprising the steps of:

sending a request from a first handling station to a control unit;

after having received said request by said control unit, sending a transfer instruction from said control unit to a first drive unit stored in a storage station, wherein the first drive unit comprises a motor coupled to the drive coupling interface of the drive unit for transmission of a mechanical force and movement from the motor to the drive coupling interface;

transferring said first drive unit from said storage station to said first handling station according to said transfer instruction received by said first drive unit;

coupling said first drive unit via a drive interface provided at said first drive unit to a driven interface provided at said first handling station, wherein the driven coupling interface is arranged stationary at the first handling station;

transmitting energy via said coupled drive and driven interface; and handling of an item inside said first handling station by said drive energy.

34. The method pursuant to claim 33, wherein the step of transmitting of energy further comprises the steps of:

transmitting electrical energy; or transmitting mechanical energy in the form of a rotational movement or a translational movement.

35. The method pursuant to claim 33, wherein the step of handling of an item further comprises the steps of:

a lifting movement of an item by said drive unit coupled to the driven interface of said first handling station within said first handling station;

a horizontal translational movement of an item by said drive unit coupled to the driven interface of said first handling station within said first handling station;

a manufacturing step at an item by said drive unit coupled to the driven interface of said first handling station within said first handling station;

an assembling step at an item by said drive unit coupled to the driven interface of said first handling station within said first handling station; or a packaging step of an item by said drive unit coupled to the driven interface of said first handling station within said first handling station.

36. A drive unit for handling of items in a handling unit, comprising:

an electrical motor;

a drive interface;

an electrical energy storage connected for electrical energy transmission to said electrical motor, wherein the electric motor is coupled to the drive interface of the drive unit for transmission of a mechanical force and movement from the electric motor to the drive interface and the driven interface is arranged stationary at a handling station; and a control unit adapted to receive control data for controlling said electrical motor, wherein said drive interface is adapted to:
transfer a drive energy from said electrical motor to a driven interface coupled to said drive interface;
transmit control data sent or to be received by said control unit; and
mechanically engage with a driven interface for stationary locking said drive unit or for guiding said drive unit along a predetermined path to a form locking engagement at a locked predetermined position.

37. The drive unit pursuant to claim 36, wherein the drive interface is adapted to transfer the mechanical drive energy for moving said drive unit to the predetermined position.

38. The drive unit pursuant to claim 36, wherein the drive interface is adapted to transfer an electrical energy from the electrical energy storage and to transmit electrical energy for charging the electrical energy storage.

39. An arrangement for intralogistical handling of items, comprising:
a storage station for storing a plurality of drive units, each drive unit comprising a drive coupling interface and each drive unit comprises a motor coupled to the drive coupling interface of the drive unit for transmission of a mechanical force and movement from the motor to the drive coupling interface;
a first handling station positioned in distance to the storage station, said first handling station comprising a driven coupling interface for coupling to said drive coupling interface of a drive unit out of the plurality of drive units, wherein the driven coupling interface is arranged stationary at the first handling station; and
a control unit coupled for signal transmission with the first handling station and configured to receive a first request signal from the first handling station, the first request signal comprising data indicating that a drive unit is required by the first handling station, and further being configured to output a transport signal, upon receipt of the first request signal, the transport signal comprising data indicating that a drive unit out of the plurality of drive units is to be transported to the first handling station;
wherein a first drive unit out of the plurality of drive units comprises a driven coupling interface adapted to couple with a drive coupling interface of a second drive unit out of said plurality of drive units.

40. The arrangement pursuant to claim 39, further comprising:
a coupling established by the drive coupling interface of said second drive unit, wherein the driven coupling interface of the first drive unit is adapted to transfer electrical energy from said second drive unit to said first drive unit.

41. The arrangement pursuant to claim 39, further comprising:
a coupling established by the drive coupling interface of said second drive unit, wherein the driven coupling interface of the first drive unit is adapted to transfer mechanical energy in the form of rotational movement or translational movement from said second drive unit to said first drive unit.

42. The arrangement pursuant to claim 39, further comprising:
a coupling established by the drive coupling interface of said second drive unit, wherein the driven coupling interface of the first drive unit is adapted to transfer control data for controlling said first and second drive unit.

43. An arrangement for intralogistical handling of items, comprising:
a storage station for storing a plurality of drive units, each drive unit comprising a drive coupling interface and each drive unit comprises a motor coupled to the drive coupling interface of the drive unit for transmission of a mechanical force and movement from the motor to the drive coupling interface;
a first handling station positioned in distance to the storage station, said first handling station comprising a driven coupling interface for coupling to said drive coupling interface of a drive unit out of the plurality of drive units, wherein the driven coupling interface is arranged stationary at the first handling station; and
a control unit coupled for signal transmission with the first handling station and configured to receive a first request signal from the first handling station, the first request signal comprising data indicating that a drive unit is required by the first handling station, and further being configured to output a transport signal, upon receipt of the first request signal, the transport signal comprising data indicating that a drive unit out of the plurality of drive units is to be transported to the first handling station;
wherein the control unit is configured to receive a failure signal indicating that a first drive unit installed in a handling station has a failure, wherein said failure signal is sent by said first drive unit out of said plurality of drive units or from said handling station, and wherein said control unit is further adapted to send out a failure compensate signal comprising data indicating that a second drive unit is to be moved to said drive unit having a failure; and
wherein the second drive unit is adapted to:
engage the first drive unit such as to replace the function of the first drive unit with the first drive unit keeping coupled to the handling station; or
replace the first drive unit by removing said first drive unit out of the coupling to the handling station and to hereafter couple via the drive coupling interface of the second drive unit to the handling station; or
engage in a first step the first drive unit such as to replace the function of the first drive unit with the first drive unit keeping coupled to the handling station, and to replace in a second step after the first step said first drive unit by removing the first drive unit out of the coupling to the handling station and to hereafter couple via said drive coupling interface of the second drive unit to the handling station.

44. An arrangement for intralogistical handling of items, comprising:
a storage station for storing a plurality of drive units, each drive unit comprising a drive coupling interface and each drive unit comprises a motor coupled to the drive coupling interface of the drive unit for transmission of a mechanical force and movement from the motor to the drive coupling interface;
a first handling station positioned in distance to the storage station, said first handling station comprising a driven coupling interface for coupling to said drive coupling interface of a drive unit out of the plurality of drive units, wherein the driven coupling interface is arranged stationary at the first handling station; and a control unit coupled for signal transmission with the first handling station and configured to receive a first request signal from the first handling station, the first request signal comprising data indicating that a drive unit is required by the first handling station, and further being configured to output a transport signal, upon receipt of the first request signal, the transport signal comprising data indicating that a drive unit out of the plurality of drive units is to be transported to the first handling station;

wherein the drive coupling interface is configured to couple to the first driven coupling interface with a second section of the drive coupling interface and to transfer energy via the second section to the first driven coupling interface, wherein the second section is arranged in a distance to the first section and the first and second section are arranged in a mirror-symmetrical arrangement about a plane running through the drive coupling interface.

45. An arrangement for intralogistical handling of items, comprising:

a storage station for storing a plurality of drive units, each drive unit comprising a drive coupling interface and each drive unit comprises a motor coupled to the drive coupling interface of the drive unit for transmission of a mechanical force and movement from the motor to the drive coupling interface;

a first handling station positioned in distance to the storage station, said first handling station comprising a driven coupling interface for coupling to said drive coupling interface of a drive unit out of the plurality of drive units, wherein the driven coupling interface is arranged stationary at the first handling station; and a control unit coupled for signal transmission with the first handling station and configured to receive a first request signal from the first handling station, the first request signal comprising data indicating that a drive unit is required by the first handling station, and further being configured to output a transport signal, upon receipt of the first request signal, the transport signal comprising data indicating that a drive unit out of the plurality of drive units is to be transported to the first handling station;

wherein the drive coupling interface is configured to couple to the first driven coupling interface with the first section of the drive coupling interface and to transfer energy via the first section to the first driven coupling interface, to simultaneously couple to a second driven coupling interface with the second section of the drive coupling interface, and to transfer energy via the second section to the second driven coupling interface.

* * * * *